US008612285B2

(12) United States Patent
Nos et al.

(10) Patent No.: US 8,612,285 B2
(45) Date of Patent: Dec. 17, 2013

(54) UNIFIED ACCESS OF KEY FIGURE VALUES

(75) Inventors: Karl-Peter Nos, Rauenberg-Malschenberg (DE); Gerald Krause, Lorsch (DE); Christoph Luebbe, Bruchsal (DE)

(73) Assignee: SAP AG, Walldorf (DE)

( * ) Notice: Subject to any disclaimer, the term of this patent is extended or adjusted under 35 U.S.C. 154(b) by 1267 days.

(21) Appl. No.: 11/862,024

(22) Filed: Sep. 26, 2007

(65) Prior Publication Data

US 2009/0083131 A1  Mar. 26, 2009

(51) Int. Cl.
*G06Q 10/00* (2012.01)
(52) U.S. Cl.
USPC ...... 705/7.39; 705/7.38; 705/14.42; 709/224; 62/230
(58) Field of Classification Search
None
See application file for complete search history.

(56) References Cited

U.S. PATENT DOCUMENTS

| | | | | |
|---|---|---|---|---|
| 5,684,964 | A * | 11/1997 | Powers et al. | 705/11 |
| 6,044,354 | A | 3/2000 | Asplen, Jr. | |
| 6,438,981 | B1 * | 8/2002 | Whiteside | 62/228.1 |
| 6,556,974 | B1 * | 4/2003 | D'Alessandro | 705/10 |
| 6,662,584 | B1 * | 12/2003 | Whiteside | 62/230 |
| 6,816,702 | B2 | 11/2004 | Kuntz et al. | |
| 7,120,643 | B2 | 10/2006 | Dill | |
| 7,184,969 | B1 * | 2/2007 | Bonnstetter et al. | 705/11 |
| 7,251,613 | B2 * | 7/2007 | Flores et al. | 705/10 |
| 7,263,520 | B2 | 8/2007 | Biedenstein et al. | |
| 7,324,954 | B2 * | 1/2008 | Calderaro et al. | 705/10 |
| 7,383,251 | B2 * | 6/2008 | Might | 1/1 |
| 7,499,870 | B1 * | 3/2009 | Petrossi | 705/10 |
| 7,533,034 | B2 * | 5/2009 | Laurin et al. | 705/7 |
| 7,584,117 | B2 * | 9/2009 | Bubner | 705/10 |
| 7,593,861 | B2 * | 9/2009 | Morrel-Samuels | 705/10 |
| 7,599,848 | B2 * | 10/2009 | Wefers et al. | 705/7 |
| 7,693,738 | B2 * | 4/2010 | Guinta et al. | 705/10 |
| 7,761,323 | B2 * | 7/2010 | Rafter et al. | 705/9 |
| 2002/0099578 | A1 * | 7/2002 | Eicher et al. | 705/7 |
| 2002/0099579 | A1 * | 7/2002 | Stowell et al. | 705/7 |
| 2002/0099580 | A1 * | 7/2002 | Eicher et al. | 705/7 |
| 2002/0099598 | A1 * | 7/2002 | Eicher et al. | 705/11 |
| 2003/0182337 | A1 * | 9/2003 | Wefers et al. | 708/490 |
| 2004/0102926 | A1 | 5/2004 | Adendorff et al. | |
| 2005/0071737 | A1 | 3/2005 | Adendorff et al. | |
| 2005/0080663 | A1 * | 4/2005 | Bauckmann | 705/11 |
| 2005/0120032 | A1 * | 6/2005 | Liebich et al. | 707/100 |
| 2005/0171833 | A1 * | 8/2005 | Jost et al. | 705/10 |
| 2006/0185275 | A1 * | 8/2006 | Yatt | 52/236.1 |

(Continued)

OTHER PUBLICATIONS

Christian Gheorghe. (May 2006). Predictive Analytics: BPM Drives the Dynamic Organization. Business Performance Management Magazine, 4(2), 21-23.*

(Continued)

*Primary Examiner* — Gurkanwaljit Singh
(74) *Attorney, Agent, or Firm* — Fish & Richardson P.C.

(57) ABSTRACT

In a computing system, key figures are made available for selection in an electronic data repository. The key figures are selectable by any of a plurality of distributed systems. A request for a key figure value calculation is received from one of the distributed systems, and request is made for an identifier of one of the key figures. Data is accessed for the key figure from at least one electronic data source, and the data is used to compute a value for the key figure. The value for the key figure is stored in an electronic storage location.

18 Claims, 5 Drawing Sheets

(56) References Cited

U.S. PATENT DOCUMENTS

| | | | |
|---|---|---|---|
| 2007/0005388 A1* | 1/2007 | Busch et al. | 705/1 |
| 2007/0078912 A1* | 4/2007 | Becker et al. | 707/204 |
| 2008/0027789 A1* | 1/2008 | Busch et al. | 705/11 |
| 2008/0082379 A1* | 4/2008 | Patterson et al. | 705/7 |
| 2008/0147457 A1* | 6/2008 | Rapp | 705/7 |

OTHER PUBLICATIONS

Jennifer Cannell. (Apr. 2006). Utilizing Dashboards for Performance Management. Credit & Financial Management Review, 12(2), 33-40.*

Maqsood A Sandhu, & A Gunasekaran. (2004). Business process development in project-based industry: A case study. Business Process Management Journal, 10(6), 673-690.*

Verena Dziobaka-Spitzhorn. (2006). From West to East: How the World's Third Largest Retailer Drives Its Global Expansion. Performance Improvement, 45(6), 41-48.*

Walden, Mark. (1996). How to evaluate and improve a forecasting process. The Journal of Business Forecasting Methods & Systems, 15(2), 22.*

Konrad Saur. (Dec. 2003). Life Cycle Management as a Business Strategy for Sustainability. Environmental Progress, 22(4), 237-240.*

Jinhong Xie, X Michael Song, Marvin Sirbu, & Qiong Wang. (1997). Kalman Filter estimation of new product diffusion models. JMR, Journal of Marketing Research, 34(3), 378-393.*

Robert Fildes. (1983). An Evaluation of Bayesian Forecasting : Abstract. Journal of Forecasting (pre-1986), 2(2), 137.*

Pan, Rong (2002). Statistical process adjustment methods for quality control in short-run manufacturing. Ph.D. dissertation, The Pennsylvania State University, United States—Pennsylvania.*

Deng, Yan K. Cathey (2002). Monitoring process and assessing uncertainty for ANFIS time series forecasting. Ph.D. dissertation, West Virginia University, United States—West Virginia.*

Rajendra P. Srivastava, & Liping Liu. (2003). Applications of Belief Functions in Business Decisions: A Review. Information Systems Frontiers: Special Issue: Business Applications of Uncertain Reasoning, 5(4), 359-378.*

\* cited by examiner

UNIFIED ACCESS OF KEY FIGURE VALUES

TECHNICAL FIELD

This disclosure relates to electronic assessments for measuring performance of business aspects.

BACKGROUND

Businesses can measure performance of the business as a whole or of an individual business unit within the business by comparing actual performance to one or more performance benchmarks. The performance benchmarks can include budgets or schedules that may be created for various aspects of the business or business unit. The budgets or schedules may represent targets, goals, or minimally acceptable levels of production, productivity, efficiency, or profitability, for example. The budgets or schedules may also correspond to a time period, such as a fiscal year or fiscal quarter, to a project like a development effort or business initiative, or to an employee, a team, or a department. To measure performance, the budgets or schedules, which may represent planned performance, can be compared to the actual performance of the business or business unit over the same period.

Businesses also frequently use computer-implemented software applications for managing and performing tasks related to the day-to-day operation of the business. The software applications may be used to receive or generate data or information that may be stored in electronic storage devices. Because this data relates to operations performed in the course of business, the data may be useful in assessing actual performance of the business, whether for a current period or an historical period. Often, business will have many different electronic storage devices that can be distributed at various locations throughout the business, and may have different access protocols for accessing information stored within different storage devices. Also, the software applications may be produced by different software manufacturers. A given software application may be able to access only one or a subset of the total number of electronic storage devices, which may limit the stored information that the software application may access.

SUMMARY

This document relates to unified access of key figure values.

In a first general aspect, a computer-implemented method of providing an assessment includes making key figures available for selection in an electronic data repository, where the key figures are selectable by any of a plurality of distributed systems. The method also includes receiving, from one of the distributed systems, a request for a key figure value calculation, and requesting an identifier of one of the key figures. The method further includes accessing data for the key figure from at least one electronic data source, using the data to compute a value for the key figure, and storing the value for the key figure in an electronic storage location.

In various implementations, the data for the key figure may include first data from a first electronic data source and second data from a second electronic data source, where the second electronic data source is different than the first electronic data source. The key figure may be created by a first distributed system of the plurality of distributed systems, and the request may be received from a second distributed system of the plurality of distributed systems, different from the first distributed system. Making the key figures available may include publishing a catalog of available key figures to the plurality of distributed systems. The catalog may include, for each key figure, a name, and a path to each of the corresponding at least one electronic data sources. The key figures may be accessed from any of the plurality of distributed systems using a common user interface. Accessing the data for the key figure may include using an access function that defines a path to the at least one electronic data source. The one of the distributed systems may include a context, and the context may be used to specify the at least one parameter value. The method may further include comparing the value for the key figure with a target value and performing an action if a difference between the target value and the value for the key figure exceeds a predetermined threshold, or implementing the key figure in a report and automatically updating the value for the key figure at predetermined intervals.

In a second general aspect, a computer program product tangibly embodied in a computer-readable medium and comprising instructions that when executed by a processor perform a method for providing an assessment. The method includes making key figures available for selection in an electronic data repository, where the key figures are selectable by any of a plurality of distributed systems. The method also includes receiving, from one of the distributed systems, a request for a key figure value calculation, and requesting an identifier of one of the key figures. The method further includes accessing data for the key figure from at least one electronic data source and using the data to compute a value for the key figure, and storing the value for the key figure in an electronic storage location.

In a third general aspect, a repository is tangibly embodied in a computer-readable medium. The repository includes a collection of key figures organized in a key figure catalog, and a software application that can be used by any system in a plurality of distributed systems to: create a key figure for inclusion in the key figure catalog; search the key figure catalog for a particular key figure or a subset of the collection of key figures; access data for a key figure selected by one of the distributed systems, the data accessed from at least one electronic data source; and calculate a value for the selected key figure using the accessed data and store the value for the selected key figure in an electronic storage location.

In various implementations, a key figure may be created by a first distributed system of the plurality of distributed systems and the key figure may be selected by a second distributed system of the plurality of distributed systems, where the second distributed system is different from the first distributed system.

Advantages of the systems and techniques described herein may include any or all of the following: Improved performance and reduced development and maintenance costs as all available key figures may be published from a central location and made available to any of several systems; consistency of data may be maintained across various applications that may share, reuse, or exchange one or more key figures; ease of use may be enhanced because access to key figures may be provided using a common interface to a variety of software applications running on a variety of systems; addition of a new key figure to the catalog may be conveniently accomplished, and the new key figure may be available to any of the systems that may access the catalog.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
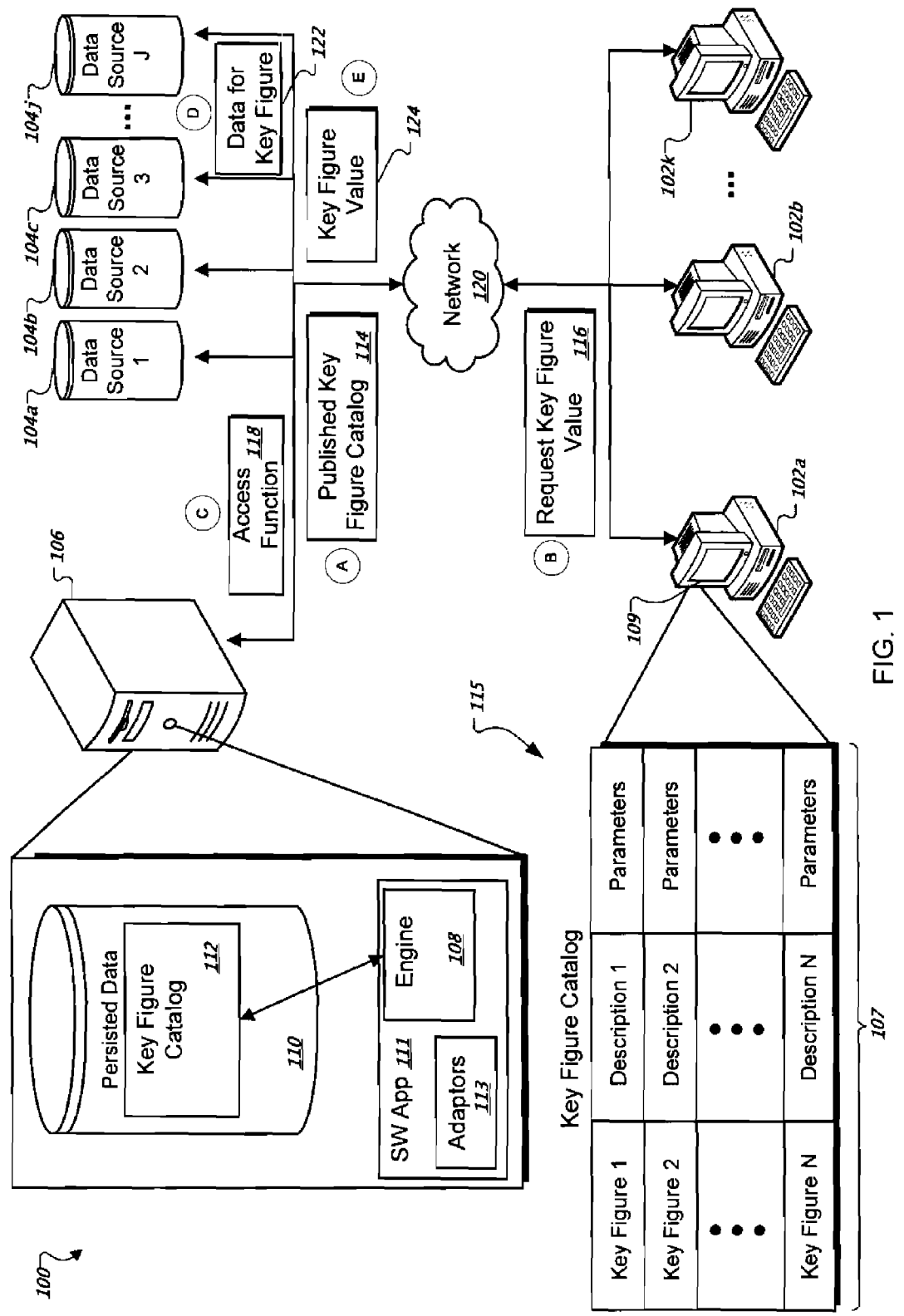
FIG. 1 is a block diagram of an exemplary system that can be used for providing an assessment using one or more key figures.

FIG. 1 is a block diagram of an exemplary system 100 that can be used for providing an assessment using one or more key figures. A "key figure" may refer to a quantifiable measure that can be expressed as a number, and which may be used to perform a business assessment. In an implementation, a key figure may be implemented as a business object defined to include one or more attributes that may each describe an aspect of the key figure. In specifying a key figure, one or more parameters may be used to define a particular perspective for the key figure, as by providing parameter values. In an implementation, a key figure, together with one or more parameters or parameter values specifying a perspective for the key figure, may define a function that can be used to compute a key figure value. Key figure values may be used, for example, in comparisons with other values as part of an assessment. In an implementation, parameters values may be selected to restrict or expand the perspective of the key figure in one or more dimensions, such that the computed key figure value reflects a desired perspective. Key figure parameters can also be used to support different aggregation levels, according to some implementations. Examples of aggregations that may be applied include sum, minimum, maximum, and average. For example, revenue may be summed over selected products, or average revenue may be determined over selected years.

The key figures or information describing the key figures may be stored in a "key figure catalog" that provides a central location for storing and maintaining key figures, and that may be published to, and accessed from, any distributed system or machine within the global system 100. Each key figure may include a name, attributes and parameters as described above, and a path description to one or more data sources, according to an implementation. In an implementation, an attribute of a key figures may provide a textual description of the key figure, or a description of how values for the key figure may be interpreted.

A user or a system may access the key figure catalog to browse available key figures in the catalog and view descriptions of the key figures. In an implementation, the user may also view semantics associated with the key figure. The key figure catalog may be filtered or searched according to an implementation, including permitting a user to specify an aspect on which the catalog should be filtered or searched, and a resulting subset of key figures may be provided. This may facilitate ease of use, as any available key figure may be conveniently located and accessed from a central location in the key figure catalog from any software application within the system, without having to separately or individually define and implement a dedicated key figure for a particular software application.

Prior to computing the key figure value, an access function may be used to retrieve stored electronic data for use in computing the key figure value. As will be described more fully below, a user may construct a call to an access function by assigning values (e.g., zero, one or more values) to parameters of the access function. In some cases, the system may automatically assign zero, one, some or all parameter values for a call to an access function. In some implementations, the access function may be used to calculate and return a key figure value. In an implementation, the access function may be associated with the key figure, and may define one or more access paths and/or protocols for accessing one or more electronic data repositories to retrieve appropriate stored electronic data for the key figure. In an implementation, an access function may be used to access one or more data sources by addressing one or more different databases from a central location. The access function may permit data to be retrieved from any of various data repositories within the system, regardless of the type of repository or database, the type of storage device wherein the repository is persisted, the requesting software application, or the type of system or device on which the software application resides or executes. Further, the access function may permit data to be accessed for a given key figure as part of an assessment for one of the distributed systems even if another of the distributed systems is concurrently requesting or performing an assessment using the same key figure.

In an implementation, the user may select a key figure from the catalog and construct a call to an access function associated with the key figure. The user may provide parameter values as by typing them in or selecting them from available choices for example. In some cases, context of the system on which the user is working or the application that the user is using may be used to provide parameter values automatically for a call to an access function. Similarly, in some implementations, preferences, user rights, privileges, access levels, title, department, project assignments, and the like may be used to supply one or more parameter values automatically.

An access function may specify a data source and a method for accessing the data source. The access function may also be used to calculate and return a key figure value, according to some implementations. The system may use the selected key figure and access function to retrieve data and use the retrieved data in computing a key figure value. Access functions may be preexisting or may be created by a user, depending on the implementation. In either case, the user may cause the access function to be called by providing parameter values for parameters of the access function. As mentioned, in some cases the system may automatically provide parameter values, such as zero, one, two, or all parameter values called for by the access function.

As one example, after selecting a key figure from the key figure catalog, the user may be presented with a list of available access functions that may be used with the selected key figure to retrieve appropriate data for computing a key figure value. The user than may select an access function and specify zero or more parameter values as part of constructing a call to the access function. The access function may then be called, and may retrieve data from the one or more data sources, using the parameter values defined in the call as appropriate. For example, some or all of the parameter values may be included in a query. In some implementations, the access function may further use the data to compute a key figure value and store the value.

In some implementations, a constructed call to an access function may be saved and may be presented for selection subsequently in association with the key figure. In an implementation, multiple users or systems may simultaneously access the key figure catalog from various distributed systems, and may concurrently select different or the same key figure from the key figure catalog. The system may retrieve data associated with the key figure for each system and may compute a key figure value for each system. Data consistency and integrity may be maintained throughout the system at all times, according to an implementation.

Key figures may be created, defined, and provided to the key figure catalog from any system within the global system 100, according to an implementation. The key figure catalog, then, may provide a global integrated view of all available key figures that can be used to perform a business assessment, including the created and provided key figure, in a uniform manner to any of the distributed systems, regardless of the supplying source system. The key figure catalog may also offer functions to access descriptive data associated with the key figures and current values of the descriptive data. As such, the key figure catalog may provide a central place for organizing key figures into a hierarchical structure to organize the key figures in a certain way.

In some implementations, key figures may be grouped into one or more subsets, where key figures within a subset share a common property. For example, certain key figures may be referred to as so-called "key performance indicators," and may measure a certain performance aspect of a business process or organization. In an implementation, a key performance indicator may be customizable or personalized for a particular system or user. In some implementations, the key performance indicators may be associated with an application that periodically monitors the key performance indicator automatically, as by periodically computing the key figure value for the key performance indicator independent of any user request. In some implementations, an action may be performed if a deviation of predetermined magnitude exists between the calculated value and a planned or target value. Such a key performance indicator may, for example, be instantiated in a report, document, spreadsheet, and the like, and may be used to provide an up-to-date continuous assessment of the corresponding performance aspect of the business process or organization, because the value associated with the indicator may be periodically or continuously updated in an automated fashion. In other implementations, this functionality may be available to all key figures, and in the descriptions that follow this will be assumed.

The key figure catalog may allow key figures to be maintained in a central location, and also may facilitate publishing and making available the key figures to various applications running on various systems. A user working from a computing device or system may view the catalog or list of available key figures, which may be made available from an electronic data repository. The user or system may request a key figure value calculation corresponding to one or more of the key figures, and data may be accessed from one or more electronic data sources and used to compute a value for the key figure. In some implementations, the calculated value may be compared with a planned or target value, and an action may be taken if the comparison reveals a deviation of at least a predetermined magnitude, for example. In this fashion, the system 100 may provide unified access to key figures to a large number of systems, and the systems may access the key figures and use valuations computed using the key figures as part of business assessments. This may provide flexibility, as key figures may be reused by various applications on various systems without dedicated configuration and maintenance of the key figure for a particular application or a particular system. In addition, any individual system within the overall system may use key figures and data associated with the key figures, where the data may be stored on any of a group of electronic storage devices throughout the system 100.

Referring again to FIG. 1, the depicted exemplary implementation is illustrative, and many variations are possible. The system 100 includes one or more computing devices 102, which may themselves be referred to as systems (e.g., individual systems or distributed systems within the global system 100), one or more data repositories 104, such as electronic data repositories, and one or more server devices 106. The computing devices 102, data repositories 104 and server 106 may be communicably coupled to one another over a network 120. While a single server device 106 and multiple computing devices 102 and data repositories 104 are shown in the example of FIG. 1, it will be appreciated by one skilled in the art that techniques described herein may be performed in a system including multiple server devices 106, as well as combinations of one or multiple computing devices 102, and one or multiple data repositories 104. In some implementations, the techniques described herein may be performed by a system comprising a standalone computing device, such as a personal computer.

In general, computing devices 102 may be client devices, according to an implementation. The client devices 102 may be any computing device operable to connect or communicate with the server 106 or the network 120 using any communication link. At a high level, each client 102 may include or execute at least one hosted business application graphical user interface (GUI) 107. A user may enter or view data under the guidance of the graphical user interface 107, which may provide views on a display 109 of the computing device 102. In some implementations, the application program may be stored in the server device 106, while in other implementations the application program may be stored locally on a client device 102. Similarly, the application program may be executed either at the server end or the client end, or according to a combination of the above. There may be any number of clients 102 (e.g., 102a, 102b, . . . , 102k) communicably coupled to the server 106. As used in this disclosure, the client 102 is intended to encompass a personal computer, touch screen terminal, workstation, network computer, kiosk, wireless data port, smart phone, mobile phone, personal data assistant (PDA), one or more processors within these or other devices, or any other suitable processing device. For example, the client 102 may be a PDA operable to wirelessly connect with an external or unsecured network.

The server 106 can comprise an electronic computing device operable to receive, transmit, process and store data associated with the system 100. Although FIG. 1 illustrates one server 106 that may be used with the disclosure, the system 100 may be implemented using computers other than servers, as well as a server pool. The server 106 may be any computer or processing device, such as, for example, a blade server, general-purpose personal computer (PC), Macintosh, workstation, Unix-based computer, or any other suitable device. According to one implementation, the server 106 may also include or be communicably coupled with a web server and/or a mail server.

The server 106 may generally host a software application 111 for providing key figure functionality to multiple systems, according to some implementations. The software application 111 may include a key figure engine 108 for maintaining a key figure catalog 112 of key figures and making key figures available for selection in one or more data repositories. The software application 111 may receive a request for a key figure value calculation from another computer system, such as a distributed computer system 102a or 102b, for example. The software application may request an identifier of one of the key figures and access data for the key figure from one or more data sources, such as electronic data sources, and may use the data to compute a value for the key figure, using the engine 108 as appropriate. The software application 111 may then store the value in an electronic storage location, transmit the value to the requesting system (e.g., system 102a or 102b), update the value in a report, use the value in a comparison, perform an action based on the a magnitude, sign, or combination of the value with another value, and the like. As is conventional, the software application may be stored in a nonvolatile storage location, internally or externally to the server 106, and may be transferred to memory (not shown for simplicity) for active use by the system 100.

The key figure catalog 112 is shown residing in a data repository 110 within the server 106 in the implementation depicted in FIG. 1. In other implementations, the key figure catalog 112 may be stored in one or more data repositories external to the server 106. Alternatively, portions of the key figure catalog 112 may be stored or maintained on one or more repositories within the server (such as repository 110), and other portions of the catalog 112 may be stored on one or more external repositories. The server 106 may execute the software application 111 and/or use key figure engine 108 to perform the techniques described herein for creating key figures, maintaining the key figure catalog 112, and responding to requests for key figure value calculations from distributed computer systems 102 within the system 100.

The server 106 also includes control devices (not shown in FIG. 1 for simplicity). The control devices may include one or more processors to execute instructions and manipulate data for performing the operations of the server 106. The control devices may include, for example, one or more central processing units (CPU), a blade, application specific integrated circuits (ASICs), field-programmable gate arrays (FPGAs), or other suitable hardware or software control systems. In the illustrated implementation, the control devices execute instructions that comprise the application program 111.

The data repositories 104 may comprise electronic storage repositories, and may be used to persist electronic data for future access. FIG. 1 shows a collection of several data repositories 104a, 104b, 104c, . . . , 104j, though any appropriate number of repositories 104 may be used in the system 100. In an implementation, the repositories 104 may comprise electronic storage devices on which one or more databases of information may be stored. The repositories 104 may be distributed throughout the system 100, for example. In some implementations, some or all of the repositories 104 may have different requirements for accessing data stored thereon. The software application 111 may include one or more data source adaptors 113 that may be used to link the key figure catalog 112 with a particular data repository 104. In one implementation, the software application 111 maintains a data source adaptor for each of the data repositories 104, where each adaptor includes access and protocol information that can be used to access data on the corresponding data repository (data source) 104. The software application 111 may construct an access function, as described above, to access any of the data repositories 104, and may do so with the aid of the data source adaptors 113, according to an implementation.

Thus, even if certain of the client devices 102 may not be able to otherwise access data stored on a particular repository (e.g., repository 104j), for example, the software application 111 and its components may be used to access available stored data throughout the system. That is, using the techniques described herein, a user working at any of the client systems 102 and using the software application 111 may gain system-wide access to all available data, which may be used for key figure value calculations for any of the key figures available in the key figure catalog 112. Additionally, data consistency may be maintained throughout the system, so that discrepancies are not introduced by the uniform and unified access provided by the software application 111.

The network 120 facilitates wireless or wired communication between the server 106 and any other local or remote computing devices or data stores within the system 100, such as client devices 102 and storage devices 104. The network 120 may be all or a portion of an enterprise or secured network. In another example, the network 120 may be a virtual private network (VPN) between the server 106 and the client 102 across a wireline or a wireless link. While illustrated as a single or continuous network, the network 120 may be logically divided into various sub-nets or virtual networks without departing from the scope of this disclosure, so long as at least a portion of the network 120 may facilitate communications between the server 106 and at least one client (e.g., client 102a).

The system may publish 114 (denoted by letter "A" in FIG. 1) the key figure catalog 112 to the distributed client to one implementation. The key figure catalog may contain key figure definitions, each of which may comprise a parameter list. The parameter list may describe parameters that a data source 104 expects and supports for accessing stored content on the data source 104. For example, according to an implementation, each parameter may be described by a name to uniquely identify the parameter, a textual description of the parameter, and a type that determines permitted values for the parameter. A user may view the key figures or descriptions of key figures on a display screen 109 of a client device (e.g., device 102a). In some implementations, an option of programmatically accessing key figure definitions may be provided. FIG. 1 shows an illustrative user interface 107 that depicts an exemplary presentation of the key figure catalog, listing key figures in a table 115 of rows and columns. The table 115 may include names of the key figures, as well as descriptions and parameter lists, according a list of valid codes may be provided.

Exemplary interface 107 is intended to be illustrative, and many variations are possible. For example, the interface 107 may alternatively show key figure names, or key figure names and descriptions, and may include one or more separate message areas for displaying additional details of a highlighted or selected key figure. For example, a details area may be presented that shows additional key figure details for a selected key figure. Key figures may be grouped into subsets and presented in the user interface accordingly. For example, key figures sharing a common attribute may comprise a subset and may be presented together in the user interface 107, which may make it easier for a user to find a desired key figure. The key figure catalog may be searched or filtered on key figure name, attribute, or parameter, according to an implementation. For simplicity, the search features described above are not shown in the exemplary interface 107, but may include one or more input fields for receiving search or filter information, which may be used to search or filter the key figure catalog 112. The interface 107 shown in FIG. 1 shows only one attribute ("Description"), but other attributes, such as an indication of how values are to be interpreted, may also be provided and made visible to a user. In some implementations, the interface 107 may provide links to one or more documents that provide further details about a key figure and/or its value.

Users of the application 111 may include, for example, executives, department managers, product managers, financial service or accounting personnel, customer service personnel, field applications personnel, repair or installation personnel, or any other users of business information who wish to track performance or perform a business assessment. The following descriptions focus on the operation of the application 111, or one of its components or sub-modules (e.g., engine 108), in performing one of the respective methods or processes. However, the system 100 contemplates using any appropriate combination and arrangement of logical elements implementing some or all of the described functionality.

A user (or the system itself in the case of automated selection) may select a key figure from the key figure catalog and request 116 (denoted by letter "B" in FIG. 1) a key figure value for the selected key figure. For example, a user may select a key figure and specify a call to an access function. A key figure may be selected in a number of ways, as by using a pointing device (e.g., a mouse, stylus, or the like) to click-on the displayed key figure or description in the user interface 107, or by selecting an icon or button (not shown) associated with the key figure, to list just a couple of examples. Alternatively, the interface 107 may include one or more input fields (not shown in FIG. 1) where key figures may be specified by name or by one or more characteristics for selection, as by typing such information using a keyboard or keypad, speaking information to a voice-recognition system, or using other data input means. Parameter values for calls to access functions may be similarly provided or selected, among other ways that parameter values may be provided. The distributed system (e.g., system 102a) may transmit the request to the server 106 over the network 120, according to an implementation, and the software application 111 may receive the request.

The software application may apply 118 (denoted by letter "C" in FIG. 1) an access function to access data stored in a data repository 104 (e.g., in repository 104a, 104b, 104c, . . . , or 104j) and retrieve 122 (denoted by letter "D" in FIG. 1) the data or a copy of the data over network 120. In some cases, the user may specify one or more aspects of the access function in conjunction with the request for the key figure value. In other cases the software application may maintain an access function and use it to access and retrieve data. In yet other cases, the user may view pre-existing access functions and select from them. In still other cases, combinations of the above may be used. Other variations are possible.

In some implementations, an access function may specify an interface to a particular data source 104, or to a class of data sources. In some implementations, the access function may specify an interface to more than one data source 104. An access function may describe a data source (e.g., data source 104b) where data for a key figure may be stored and how access to the data is procured. In an implementation, an access function may be evaluated at run time, and data may be accessed from the data sources 104. At run time, both meta data and actual data may be retrieved by functions of the system. Systems may be delivered with access functions pre-configured, according to an implementation, and in some implementations, customers or users may be able to define new access functions or modify existing access functions. The access function may supply parameters to the data source 104 and extract information. For example, an access function may specify a time period (e.g., hour, day, week, month, year, fiscal period, etc.), an organizational unit, an account or group of accounts, or other parameters or values.

The software application 111 may use the retrieved data to calculate a key figure value. As described above, the key figure, together with parameters that may define a perspective for the key figure, may comprise a function that can be used to compute a key figure value. The retrieved data may be used as inputs to the function, according to an implementation. The server 106 may then store 124 (denoted by letter "E" in FIG. 1) the key figure value in an electronic storage location. For example, the server 106 may store the value in a storage location on the client device 102, and the value may be presented to the user on the display 109 of the device by the user interface. Other examples include providing the value to a report at the client device 102 or the server device 106, or storing the value on one of the data repositories 104 or at a storage location within the server (e.g., within persisted data 110). In other implementations, the value may be emailed to a recipient. In some implementations, a key figure value may be used in the computation of another key figure value.

Figure 2:
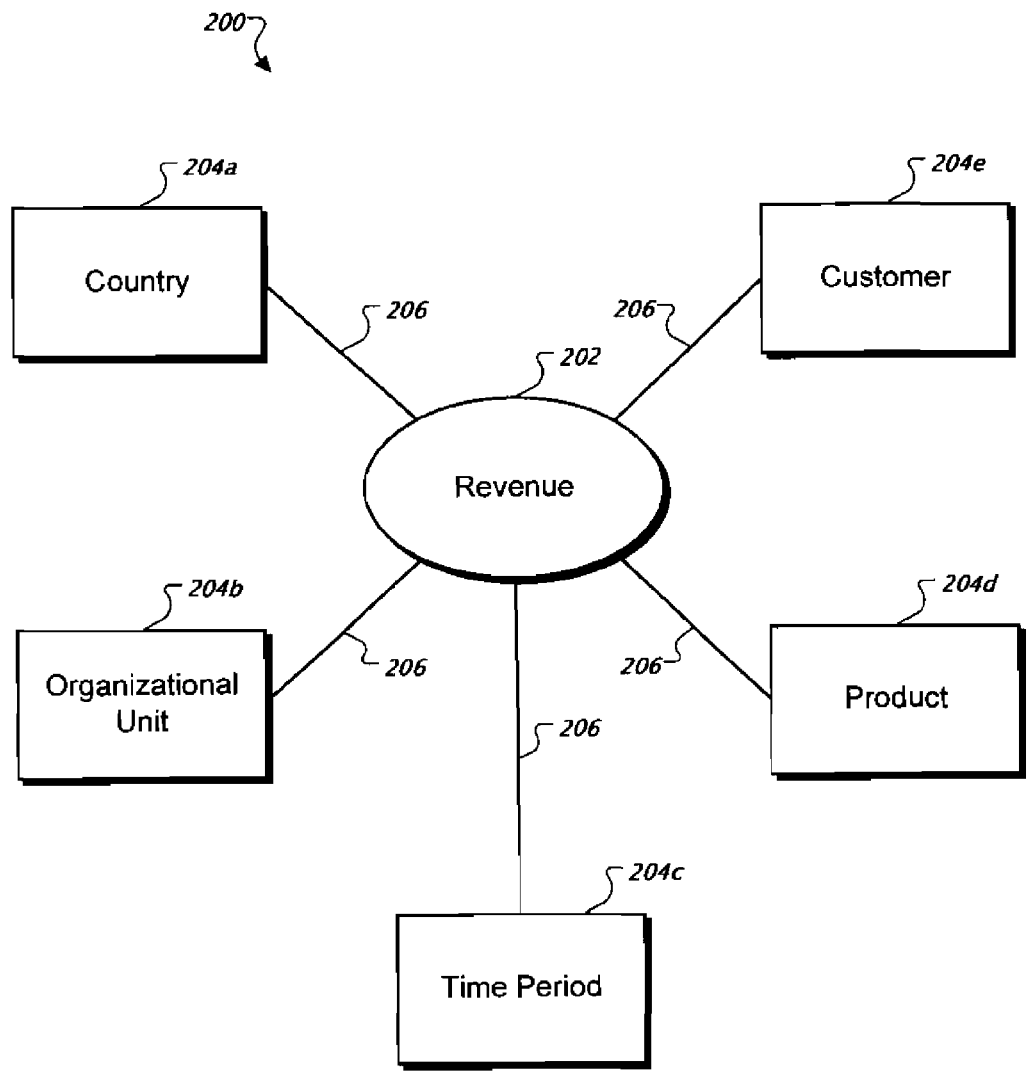
FIG. 2 is a block diagram of an exemplary representation of an analytical model of a key figure.

FIG. 2 is a block diagram of an exemplary representation 200 of an analytical model of a key figure. The representation 200 may provide a graphical depiction of a key figure, which may be useful, for example, to design a key figure. In some implementations, the user interface may provide a view that permits a user to design a new key figure by selecting objects and associations to specify a measure that may be used in a business assessment. In this fashion, a user (working at system 102b, for example) may easily design a new key figure, which may thereafter be added to the key figure catalog 112 and made available to any of the systems 102 in the global system 100.

The key FIG. 202 in this example has name "Revenue," is represented by an oval, and may define a function to compute revenue generated according to a number of parameters, each of which may contribute to a definition of scope for the key figure. In this example, the key figure "Revenue" 202 has five parameters 204, each represented by a rectangle in the representation 200. A "Country" parameter 204a may be used to specify one or more countries for which revenue generation should be considered. An "Organizational Unit" parameter 204b permits the scope of the inquiry to be limited to one or more organizational units within a business. A "Time Period" parameter 204c allows specification of one or more time periods over which revenue generation should be considered. A "Product" parameter 204d can be used to specify one or more products such that only revenue associated with those products is considered, and a "Customer" parameter 204e allows the inquiry to be restricted to one or more customers. Each of the parameters 204 are connected to the key FIG. 202 in the representation by a connecting line 206, which may provide a visual indication of the dependencies comprising the key figure definition. Many other parameters may be used. Examples of other or additional parameters that may be used to design or define a key figure can include employee, name, and identification (ID).

Figure 3:
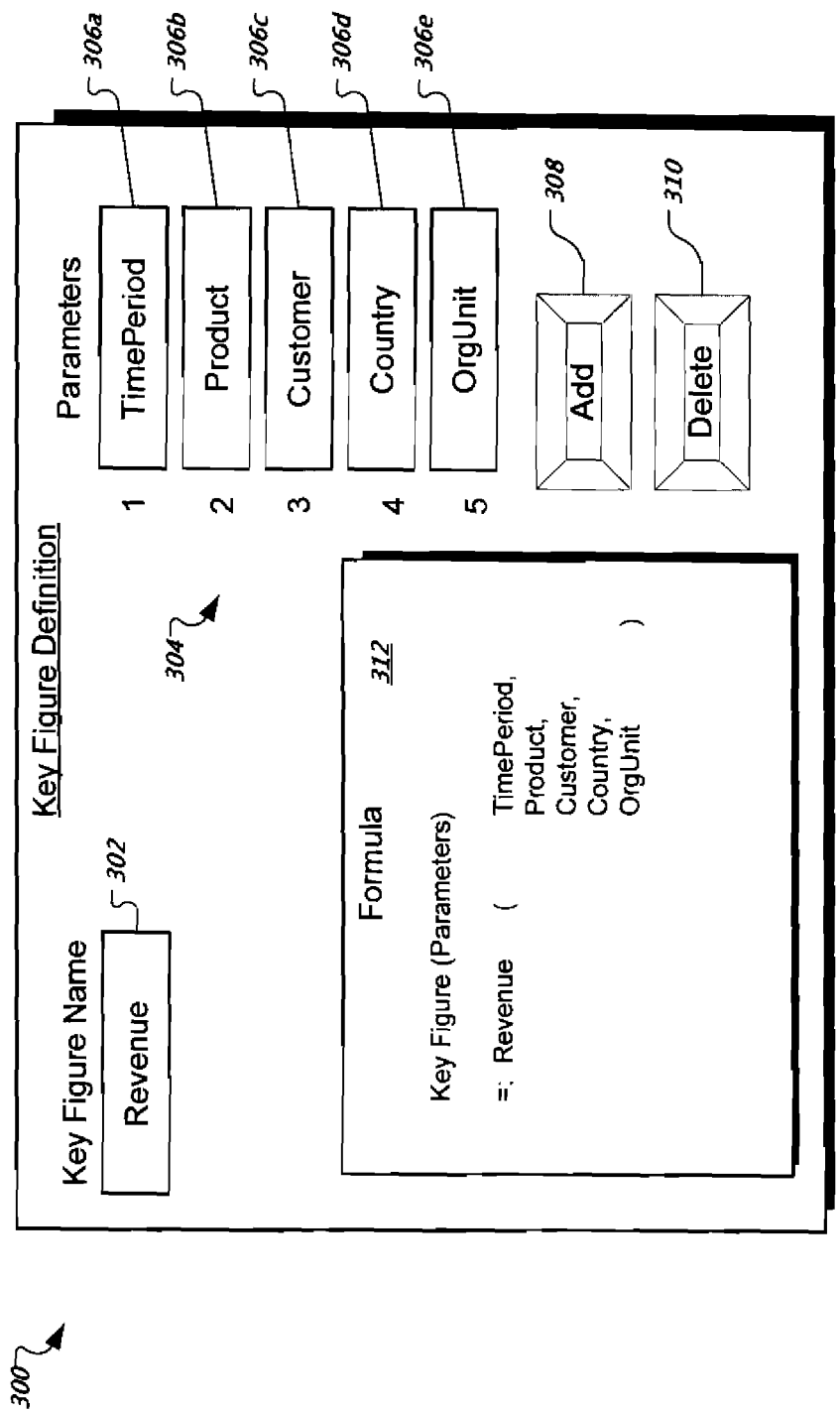
FIG. 3 is a screen shot of an exemplary user interface view that can be used to specify a key figure definition.

FIG. 3 is a screen shot of an exemplary user interface view 300 that can be used to specify a key figure definition. The view 300 may be presented, for example, on display 109 of a client device 102 (see FIG. 1). The view 300 includes an input field 302 where a user may enter a name for a key figure to be defined. In this example, the user has entered "Revenue" in the name field 302. The view further includes a parameter definition area 304 where a user may specify parameters for the key figure. In this example, the user has specified five parameters 306, including "TimePeriod" in a first parameter field 306a, "Product" in a second parameter field 306b, "Customer" in a third parameter field 306c, "Country" in a fourth parameter field 306d, and "OrgUnit" in a fifth parameter field 306e. An "Add" button 308, when selected, may permit another parameter input field 306 to be added for inclusion in the definition. Similarly, a delete button 310, when selected, may permit a selected parameter input field 306 to be removed. The user may also define the type of value that a key figure calculation may return. For example, an input field with a list box of type choices (not shown) may be provided, and the user may select an appropriate type.

A function pane 312 may display a key figure definition that includes a name of the key figure and one or more parameters that can be used to define a perspective for the key figure. In this example, the function pane 312 shows the key figure name "Revenue," since that is the name selected in the name field 302. Similarly, the function pane 312 shows each of the parameters that are defined in the parameter fields 306. In an implementation, if a user selects the add button 308 and enters a name of an additional parameter, such as "Employee," the function pane 312 may be updated to include the additional parameter. In implementations where the access function calculates a key figure value from one or more underlying key figure values, a formula may be used that specifies how the compound value is constructed.

In various implementations, a user may use the software application 111 to design or define a key figure for inclusion in the key figure catalog 112. In some implementations, the software application 111 may present a user interface that permits the use to design a key figure by selecting (e.g., from a list) objects to build a key figure. As one example, an interface may include a representation similar to the exemplary representation 200 of FIG. 2. In like fashion, the user may define a key figure using an interface similar to the view 300 shown in FIG. 3, according to some implementations.

Referring again now to FIG. 1, suppose that a user wishes to select a key figure from the key figure catalog 112. Suppose that the catalog contains many key figures, some delivered with the system and some designed and defined by various users of the system, using the interfaces shown in FIGS. 2-3, for example. The user may view the interface 107, browse the catalog 112 by viewing available key figures in the table 115, and select a key figure. Suppose that in this example the user is a line manager in a specific department within a company, such as the widget department of Company X. They system may recognize the user, such as receiving a login from the user or recognizing an identifier associated with the client device (e.g., device 102a) that the user is using.

In some implementations, the software application 111 may use context to supply values for one or more of the parameters associated with a key figure. In this example, suppose that the line manager selects a revenue key figure from the catalog 112, and suppose that the revenue key figure has been defined to have the parameters described above in reference to FIG. 3. In this example, the system may use context to supply values for the "Org Unit" parameter, as by recognizing the line manager as belonging to a particular organizational unit (the "widget department" in this case). Similarly, the system may use context to supply the "Product" parameter, and provide "widget" as the parameter value by recognizing the line manager, department, or client machine from which the request originates. As another example, the system may automatically use the current time period (i.e., using context to specify a parameter) as a parameter value. Other parameter values could similarly be provided by context in other examples. In this fashion, key figure selection and specification may be simplified, as the user may not need to think about appropriate values to enter because the system may recognize and supply the appropriate values. In some cases, parameter values may also be fixed at design time. In this example, the line manager may specify a time period of interest, and a country and customer for which the key figure should be calculated.

In many cases, the system 100 may include many data sources 104 and many client systems 102. Using techniques described herein, unified access to the many data sources 104 may be provided concurrently, and data integrity may be maintained, while providing a common interface and making available a shared set of key figures to each of the distributed systems 102.

As another example, a business or a management team may wish to obtain an assessment using one or more key figures to aid in decision-making. For example, a manager of a given organizational unit within a business may be tasked with deciding how to allocate budget resources for an upcoming fiscal period. To make this determination, which may also involve several sub-determinations, the manager may wish to review past performance and use the results, and the information imparted by the results, to guide or shape future decisions.

As part of the exercise, the manager may wish to allocate costs for a production budget. In doing so, it may be helpful for the manager to review an assessment of all costs over the previous period for the particular organizational unit. The manager may use a key figure to calculate such information. Further, the manager may wish to compare past or present performances of various suppliers to determine which of the suppliers merit future patronage. Performance of the suppliers may be measured in numerous ways, including based on pricing considerations, timing and delivery considerations, support considerations, breadth of offering considerations, ease of use considerations, quality considerations, and the like. Again, the manager may use one or more key figures to calculate such information.

The manager may access the key figure catalog 112 via the user interface 107, and may filter the catalog to view a subset of the available key figures. The manager may then browse and review definitions and semantics of the key figures, which may be provided as described above, as in a table or in a message area of the interface 107. For a given key figure, meta data for the key figure may be accessed to provide description (e.g., description of the technical properties) of the key figure or definitional information that the manager may view, which may assist the manager in determining which key figures may be appropriate for the task at hand. The manager may then select one or more key figures, and, according to some implementations, may specify one or more parameter values. In an implementation, a view similar to the function pane 312 of FIG. 3 may be presented, and the manager may enter values for the particular parameters. This information may then be submitted to the software application 111, and a key figure value may be calculated as described above.

In some examples, the selected key figure may have been created from an application that the manager is using to select the key figure; in other examples, the key figure may have been created from another application, including from a different distributed client system 102. In some cases, the system may use context to supply one or more parameter values.

An access function associated with the key figure may be used to access one or more data sources 104 to retrieve data for the key figure. In addition to including a path for use in accessing the one or more data sources 104, the access function may include one or more SQL statements for accessing one or more specific databases in one or more data sources 104, according to an implementation. A key figure value may be calculated using the retrieved data. According to some implementations, the calculated key figure value may be compared to a target value (e.g., historical value, benchmark value, goal value, etc.), and an action may be triggered if a deviation between the actual value and target value meets or exceeds a threshold value. For example, if the key figure is used to compute travel costs for a time period, and if actual travel costs for the period exceed a budgeted value for travel costs, a warning message may be displayed.

In some implementations, a key figure can be implemented in a report. For example, a user may select a key figure and a link may be created between the report and the key figure catalog. The key figure may be automatically updated and evaluated at periodic or specific intervals according to an implementation. For example, a manager of a production facility that produces may define a report that includes a key figure that measures actual unit output on an ongoing basis.

In some cases, authorization may be required to access certain key figures. The authorization may be provided, for example, by entering a password, according to an implementation. In other cases, the system may recognize the user (as by login information), and may determine whether the user has been granted rights to certain key figures or data. Similarly, accessing certain data sources 104 for a particular key figure may require authorization. Examples where this may be appropriate include data sources that store sensitive information, for instance.

Figure 4:
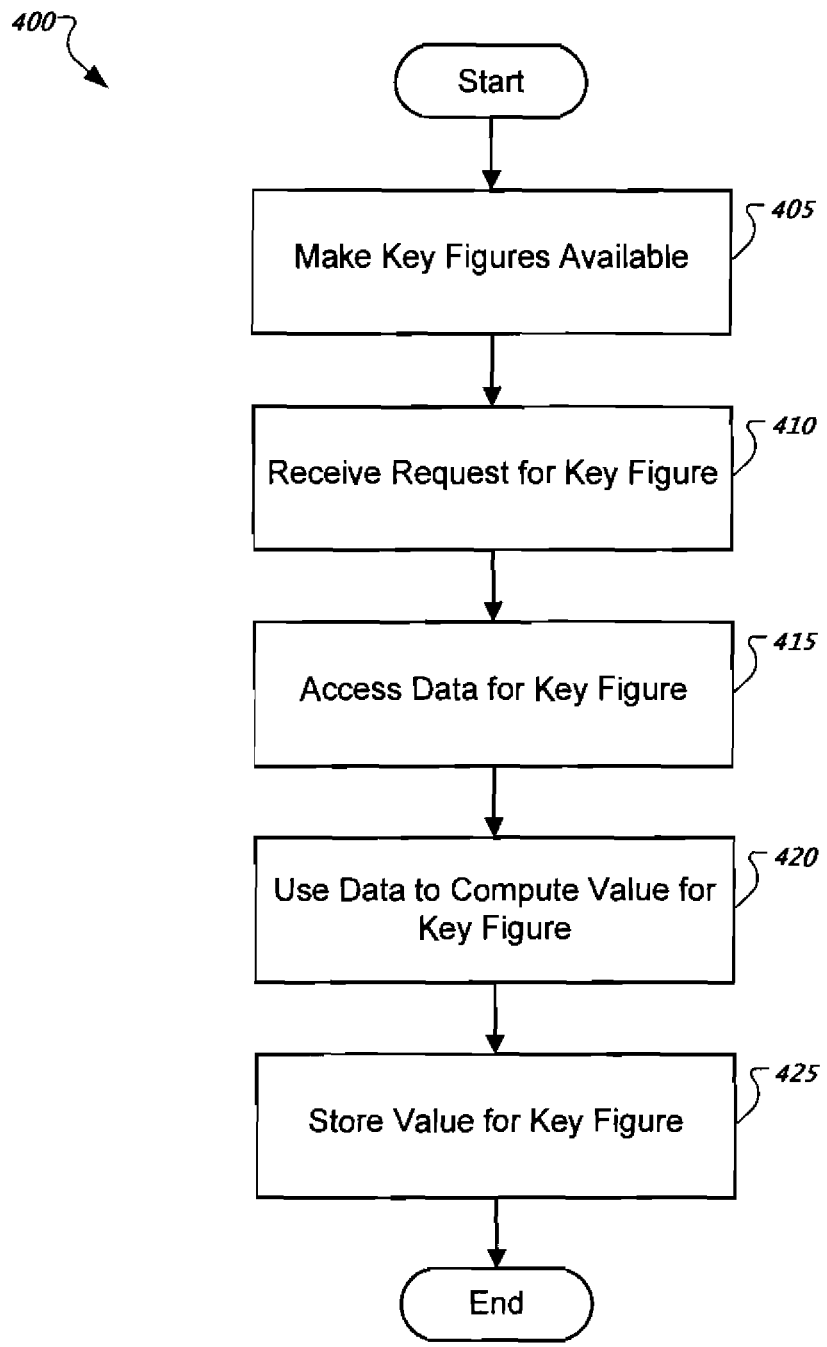
FIG. 4 is a flow chart of exemplary operations that can be performed to provide an assessment.

FIG. 4 is a flow chart 400 of exemplary operations that can be performed to provide an assessment. A process begins at step 405 with making key figures available. The key figures may be stored in a key figure catalog in an electronic data repository, for example, and may be made available by publishing the key figure catalog to a group of distributed computer systems. For instance, a user may be able to view the key figures in the key figure catalog from a display screen of a computing device communicably linked to a server that manages the key figure catalog, according to an implementation. The key figure catalog may include, for each key figure, a name, at least one parameter, and a path to each of the corresponding at least one data sources, according to an implementation. As part of the publishing of the key figure catalog to the distributed computer systems, the key figure catalog may be searchable or filtered according to search or filter criteria. Results of the search or filter operation, which may include a subset of the available key figures, may then be presented to the distributed computer system requesting the search or filter operation on the catalog. Also, descriptions of the key figures may be made available, including descriptions of parameters that the key figure includes for defining a perspective of the key figure. Meta data for the key figure may be accessed from an electronic storage location to provide the description of the key figure.

A request for a key figure may be received at step 410. The request may be a request for a key figure value calculation, for example. The key figure value calculation may be used as part of a business assessment, and the request may originate from a distributed computer system. A request may be made for an identifier of one of the key figures. The request may include a request to specify one or more parameters for the key figure, which may together define a perspective for the key figure.

Data for the key figure may be accessed at step 415. The data may be accessed from one or more electronic data sources, for example, and an access function may be used to access the data. The access function may define an address or path to an appropriate electronic data source that stores data relevant for the key figure value calculation. The access function may include an access statement that may permit the system to access and retrieve the data within the electronic data source. The access statement may include at least one parameter value associated with the key figure. In some cases, an access function can include paths and access statements to more than one electronic data source. In other cases, a separate access function may be used for access to each electronic data source.

The data may be used to compute a value for the key figure at step 420. The value may be referred to as a key figure value, and may be computed using a function associated with the key figure. The function may use the retrieved data as input to compute the value, for example. The key figure value may be time-dependent, as the value of the key figure may differ depending on a time period over which the key figure is evaluated. The value for the key figure may be stored in an electronic storage location at step 425. The electronic storage location may be located at the distributed computer system, for example, or may be located at the central computer system.

In some implementations, the value may be compared to a target value. An action may be taken based on the comparison result, according to an implementation. For example, if the computed value is more than a predetermined threshold value above or below the target value, an appropriate action may be taken. Examples of possible actions may include a warning being issued, an email being sent, a meeting called, a notification presented on a display, an alternative approach initiated, and the like.

Examples of data sources that can be accessed to retrieve data for a key figure value calculation may include business warehouse data cubes. A first access function may be specified to retrieve financial information from one or more data sources, such as data sources maintaining a company's business intelligence system, according to an implementation. As another example, a second access function may be specified to retrieve organizational data from one or more data sources within a company. A user may specify a key figure related to revenue or to travel cost, for example, and may construct a call to the first access function and specify parameters corresponding to desired information. For example, the user may be interested in revenues for the past year or travel costs for a particular quarter, to list just a couple of examples. Other parameters, if appropriate, may be used to further define the scope of the key figure value. Similarly, a user may use key figures associated with employees or sick days to request a key figure value and construct a call to the second access function to determine the number of employees in a particular business unit or the number of sick days that a workers in a particular department have taken over a specified time period, according to an implementation.

Figure 5:
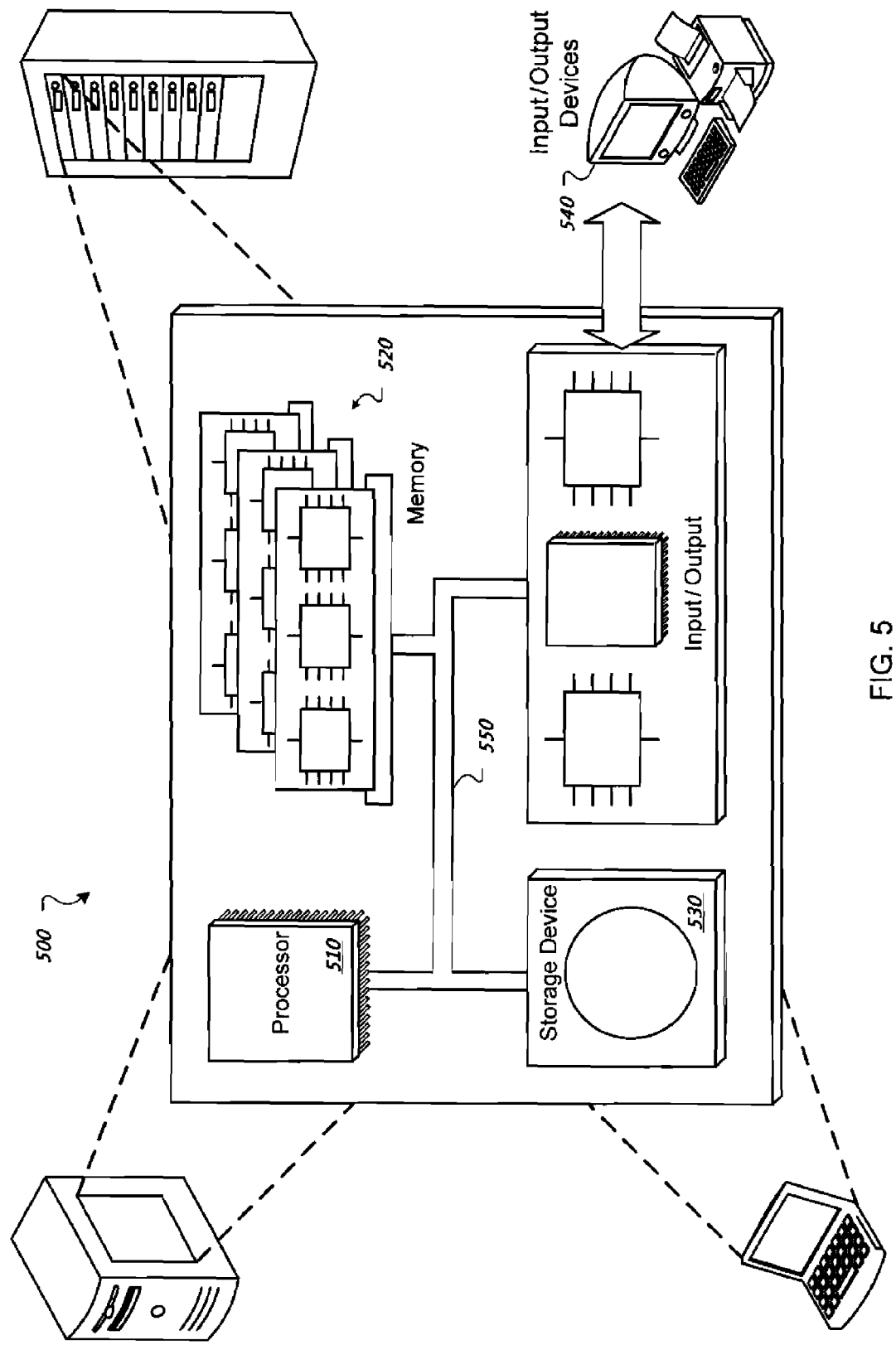
FIG. 5 is a block diagram of an exemplary computing system that can be used in connection with computer-implemented methods described in this document.

FIG. 5 is a block diagram of an exemplary computing system 500 that can be used in connection with computer-implemented methods described in this document. The system 500 can be used for the operations described in association with any of the computer-implement methods described previously, according to an implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of providing an assessment, the method comprising:

making, using one or more processors, key figures available for selection from a catalog of key figures in an electronic data repository, each of the key figures associated with a quantifiable measure that can be expressed as one or more key figure values for use in a business assessment, wherein the electronic data repository serves as a central location for storing and maintaining the key figures, the key figures selectable by any of a plurality of distributed computing systems such that a user at any of the plurality of distributed computing systems has system-wide access to all available key figure data for key figure value calculations for any of the key figures available in the catalog of key figures in the electronic data repository;

receiving, at the central location and from the user at one of the distributed computing systems, a request for a key figure value calculation for a key figure selected by the user from the electronic data repository, the request being transmitted by the one of the distributed computing systems associated with the user, and requesting an identifier of one of the key figures;

accessing, using the one or more processors, key figure data for the key figure from two or more electronic data sources, each accessed electronic data source having stored therein key figure data associated with the requested key figure value calculation, wherein accessing the key figure data includes using an access function that defines a path to each of the two or more electronic data sources, and that defines protocol information for gaining access to each of the two or more electronic data sources;

determining, using the one or more processors and the accessed key figure data, a value for the key figure; and providing the determined value for the key figure to the one of the distributed computing systems associated with the user in response to the request.

2. The computer-implemented method of claim 1, wherein the key figure is created by a first distributed computing system of the plurality of distributed computing systems and wherein the request is received from a second distributed computing system of the plurality of distributed computing systems, different from the first distributed computing system.

3. The computer-implemented method of claim 1, wherein making the key figures available comprises publishing a catalog of available key figures to the plurality of distributed computing systems.

4. The computer-implemented method of claim 3, wherein the catalog includes, for each key figure, a name, and the path to each of the corresponding two or more electronic data sources.

5. The computer-implemented method of claim 1, wherein the key figures may be accessed from any of the plurality of distributed computing systems using a common user interface.

6. The computer-implemented method of claim 1, wherein receiving the request for the key figure value calculation includes receiving at least one parameter value that defines a particular perspective for the key figure selected by the user.

7. The computer-implemented method of claim 6, wherein the one of the distributed computing systems includes a context, and wherein the context is used to specify the at least one parameter value.

8. The computer-implemented method of claim 1, further comprising comparing the determined value for the key figure with a target value and performing an action if a difference between the target value and the determined value for the key figure exceeds a predetermined threshold.

9. The computer-implemented method of claim 1, further comprising implementing the key figure in a report and automatically updating the value for the key figure at predetermined intervals.

10. A computer program product tangibly embodied in a non-transitory computer-readable medium and comprising instructions that when executed by a processor perform a method for providing an assessment, the method comprising:
    making key figures available for selection from a catalog of key figures in an electronic data repository, each of the key figures associated with a quantifiable measure that can be expressed as one or more key figure values for use in a business assessment, wherein the electronic data repository serves as a central location for storing and maintaining the key figures, the key figures selectable by any of a plurality of distributed computing systems such that a user at any of the plurality of distributed computing systems has system-wide access to all available key figure data for key figure value calculations for any of the key figures available in the catalog of key figures in the electronic data repository;
    receiving, at the central location and from the user at one of the distributed computing systems, a request for a key figure value calculation for a key figure selected by the user from the electronic data repository, the request being transmitted by the one of the distributed computing systems associated with the user, and requesting an identifier of one of the key figures;
    accessing key figure data for the key figure from two or more electronic data sources, each accessed electronic data source having stored therein key figure data associated with the requested key figure value calculation, wherein accessing the key figure data includes using an access function that defines a path to each of the two or more electronic data sources, and that defines protocol information for gaining access to each of the two or more electronic data sources;
    determining, using the accessed key figure data, a value for the key figure; and
    providing the determined value for the key figure to the one of the distributed computing systems associated with the user in response to the request.

11. The computer program product of claim 10, wherein the key figure is created by a first distributed computing system of the plurality of distributed computing systems and wherein the request is received from a second distributed computing system of the plurality of distributed computing systems, different from the first distributed computing system.

12. The computer program product of claim 10, wherein making the key figures available comprises publishing a catalog of available key figures to the plurality of distributed computing systems.

13. The computer program product of claim 12, wherein the key figures may be accessed from any of the plurality of distributed computing systems using a common user interface.

14. The computer program product of claim 10, wherein receiving the request for the key figure value calculation includes receiving at least one parameter value that defines a particular perspective for the key figure selected by the user.

15. The computer program product of claim 14, wherein the one of the distributed computing systems includes a context, and wherein the context is used to specify the at least one parameter value.

16. The computer program product of claim 10, further comprising instructions that when executed compare the determined value for the key figure with a target value and perform an action if a difference between the target value and the determined value for the key figure exceeds a predetermined threshold.

17. A repository tangibly embodied in a non-transitory computer-readable medium, the repository comprising:
    a collection of key figures organized in a key figure catalog, the key figure catalog serving as a central location for storing and maintaining the key figures, each of the key figures in the collection of key figures associated with a quantifiable measure that can be expressed as one or more key figure values for use in a business assessment;
    a software application that can be used by a user at any system in a plurality of distributed computing systems to:
        create a key figure for inclusion in the key figure catalog;
        search the key figure catalog for a particular key figure or a subset of the collection of key figures;
        access key figure data for a key figure selected by the user at one of the distributed computing systems for a request for a key figure value calculation, the key figure data accessed from two or more electronic data sources, each accessed electronic data source having stored therein key figure data associated with the requested key figure value calculation, wherein accessing the key figure data includes using an access function that defines a path to each of the two or more electronic data sources, and that defines protocol information for gaining access to each of the two or more electronic data sources; and
        calculate a value for the selected key figure using the accessed key figure data and provide the value for the key figure to the user in response to the request; such that the user at any of the plurality of distributed computing systems has system-wide access to all available key figure data for key figure value calculations for any of the key figures available in the key figure catalog.

18. The repository of claim 17, wherein a key figure is created by a first distributed computing system of the plurality of distributed computing systems and wherein the key figure is selected by a second distributed computing system of the plurality of distributed computing systems, different from the first distributed computing system.

* * * * *